US006205268B1

(12) United States Patent
Chraplyvy et al.

(10) Patent No.: US 6,205,268 B1
(45) Date of Patent: Mar. 20, 2001

(54) ARRANGEMENT OF OPTICAL FIBER SEGMENTS FOR MINIMIZING EFFECT OF NONLINEARITIES

(75) Inventors: Andrew Roman Chraplyvy, Matawan; Bernard Raymond Eichenbaum, Basking Ridge; Gary Patrick Emery, Monmouth Beach, all of NJ (US); Janice Bilecky Haber; David Kalish, both of Roswell, GA (US); Raymond Bradfield Kummer, Lilburn, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/255,454

(22) Filed: Feb. 19, 1999

Related U.S. Application Data

(60) Continuation-in-part of application No. 09/116,528, filed on Jun. 16, 1998, now Pat. No. 6,011,892, which is a division of application No. 08/862,805, filed on May 23, 1997, now Pat. No. 5,831,761, which is a continuation of application No. 08/599,702, filed on Feb. 9, 1996, now Pat. No. 5,719,696, and a division of application No. 08/069,952, filed on May 28, 1993, now Pat. No. 5,587,830.

(51) Int. Cl.[7] ........................................................ G02B 6/28

(52) U.S. Cl. ................................ 385/24; 385/123; 385/27; 359/341

(58) Field of Search .................................. 385/24, 37, 27, 385/12, 124, 128, 134, 130; 359/341, 124, 161, 177; 372/6

(56) References Cited

U.S. PATENT DOCUMENTS

| 3,933,454 | 1/1976 | DeLuca ........................................ 75/3 |
| 4,578,101 | 3/1986 | Clark et al. ............................... 65/109 |
| 4,820,322 | 4/1989 | Baumgart et al. ..................... 65/3.11 |
| 5,000,771 | 3/1991 | Fleming, Jr. et al. ...................... 65/2 |
| 5,002,350 | 3/1991 | Dragone ............................. 350/99.15 |
| 5,136,671 | 8/1992 | Dragone ................................. 385/46 |
| 5,224,183 | 6/1993 | Dugan ..................................... 385/28 |
| 5,327,516 | 7/1994 | Chraplyvy et al. .................... 385/123 |
| 5,412,744 | 5/1995 | Dragone ................................. 385/24 |
| 5,587,830 | 12/1996 | Chraplyvy et al. .................... 359/341 |
| 5,623,508 | 4/1997 | Grubb et al. .............................. 372/3 |
| 5,719,696 | * | 2/1998 | Chraplyvy et al. .................... 359/341 |
| 5,809,196 | 9/1998 | Meli et al. ............................. 385/123 |
| 5,831,761 | * | 11/1998 | Chraplyvy et al. .............. 385/123 X |
| 6,011,892 | * | 1/2000 | Chraplyvy et al. .................... 385/123 |

OTHER PUBLICATIONS

M. Yamada, et al., "Broadband and gain–flattened amplifier composed of a 1.55μm–band Er[3]–doped fibre amplifier in a parallel configuration," Electronics Letters, 10th Apr. 1997, vol. 33, No. 8, 710–711.

(List continued on next page.)

*Primary Examiner*—Phan T. H. Palmer
(74) *Attorney, Agent, or Firm*—Michael A. Morra

(57) ABSTRACT

A high-capacity optical fiber network [100, 200] includes wavelength-division multiplexing (WDM) within the 1.4 micron (μm) wavelength region (i.e., 1335–1435 nm). Such a system includes optical fiber [130] whose peak loss in the 1.4 μm region is less than its loss at 1310 nm. The optical fiber has a zero dispersion wavelength ($\lambda_0$) at about 1310 nm, and linear dispersion between about 1.5 and 8.0 ps/nm-km within the 1.4 μm region. At least three WDM channels operate at 10 Gb/s in the 1.4 μm wavelength region and have a channel separation of 100 GHz. In one illustrative embodiment of the invention, a broadcast television channel, having amplitude modulated vestigial sideband modulation, simultaneously operates in the 1.3 μm region (i.e., 1285–1335 nm) and/or the 1.55 μm region (i.e., 1500–1600 nm). In another embodiment of the invention, 16 digital data channels are multiplexed together in the 1.55 μm region, each channel operating at about 2.5 Gb/s. Raman amplifiers [103, 113] are used for amplification in the 1.3 μm and the 1.4 μm wavelength regions, whereas an Erbium amplifier [123] is used for amplification in the 1.55 μm wavelength region.

28 Claims, 5 Drawing Sheets

OTHER PUBLICATIONS

F. Hanawa, et al., "Fabrication Of Completely OH–Free V.A.D. Fibre," Electronics Letters, 28$^{th}$ Aug. 1980, vol. 16, No. 18, 699–700.

D. Marcuse, et al., "Effect of Fiber Nonlinearity on Long–Distance Transmission," Journal of Lightwave Technology, vol. 9, No. 1, Jan. 1991, 121–128.

I. P. Kaminow, et al. eds., *Simulated Raman Scattering*, Optical Fiber Telecommunications III Academic Press, 1997, 239–248.

S. E. Miller, et al., eds., *Vapor Axial Deposition (VAD) Process*, Optical Fiber Telecommunications II, Academic Press, 1988, 169–180.

R. G. Waarts, et al., "Nonlinear Effects in Coherent Multichannel Transmission Through Optical Fibers," 8078 Proceeding of the IEEE, 78(1990)Aug., No. 8, 1345–1367.

D. Marcuse, "Single–Channel Operation In Very Long Nonlinear Fibers With Optical Amplifiers At Zero Dispersion," Journal of Lightwave Technology, vol. 9 No. 3, Mar. 1991, 356–360.

* cited by examiner

ARRANGEMENT OF OPTICAL FIBER SEGMENTS FOR MINIMIZING EFFECT OF NONLINEARITIES

CROSS REFERENCE TO RELATED APPLICATIONS

This invention is a Continuation-In-Part of Application Ser. No. 09/116,528, U.S. Pat. No. 6,011,892 that was filed on Jun. 16, 1998; which is a division of Ser. No. 08/862,805 is now U.S. Pat. No. 5,831,761 that was filed on May 23, 1997; which is a continuation of Ser. No. 08/599,702 is now U.S. Pat. No. 5,719,696 that was filed on Feb. 9, 1996; which is a division of 0869821 U.S. Pat. No. 5,587,830 that was filed on May 28, 1993.

TECHNICAL FIELD

This invention relates to singlemode optical fiber systems, and more particularly to wavelength-division multiplexing (WDM) on such systems.

BACKGROUND OF THE INVENTION

Dispersion is a phenomenon whereby different optical wavelengths travel at different speeds through a dispersive media such as glass. And since a modulated carrier signal comprises many wavelengths, the optical signal that emerges from the distant end of a glass fiber is a smeared version of the signal that was launched into the near end. In the case of linear dispersion, this is solved by periodically providing compensation along an optical fiber route, and fewer compensation stages are better.

Conventional singlemode fiber systems primarily operate in the wavelength region between 1285 and 1335 nanometers (nm) and have a zero-dispersion wavelength at about 1310 nm. However, the optical fiber used in such systems is poorly suited for transmitting multiple closely spaced carrier wavelengths because of nonlinear interactions and mixing between the channels. The limiting form of such nonlinear phenomena—4-photon mixing (4PM)—is described in the literature (see e.g., article by D. Marcuse, A. Chraplyvy and R. Tkach entitled: "Effect of Fiber Nonlinearity on Long-Distance Transmission," *Journal of Lightwave Technology*, vol. 9, No. 1, January 1991, pp. 121–128). Briefly, 4PM appears as a fluctuating gain or loss due to constructive and destructive interference between different signal channels. The magnitude of 4PM is power dependent and may be reduced by decreasing launch power.

Multi-channel optical systems provide the most efficient use of an optical fiber and include wavelength-division multiplexers, which operate to combine an number of closely spaced channels (wavelength regions) onto a single optical path in one direction of transmission, and to separate them from the optical path in the other direction of transmission. And while conventional singlemode fiber systems do provide WDM operation in the 1.55 μm wavelength region, there is too much linear dispersion (e.g., about 17 ps/nm-km) that needs to be compensated. For example, compensation is required every 50 to 100 kilometers, which is an impractical short distance.

Contemplated uses of optical fiber include the transmission of all type of digital and analog information, both separately and together. Particular uses include data (such as Internet traffic) as well as broadcast television (TV) signals, which typically utilize amplitude modulated, vestigial-sideband (AM-VSB) modulation. Analog signals are inherently noise sensitive, and noise is readily observable in TV pictures. In particular, when multiple wavelengths such as WDM signals are transmitted on a single fiber, stimulated Raman scattering (SRS) causes energy to be transferred from the WDM signals into another wavelength region that is as much as 120 nm longer. At the present time, there are no systems that provide WDM and analog TV signals over the same optical fiber.

It has been observed in the article entitled: Fabrication Of Completely OH-Free V.A.D. Fiber in *Electronics Letters*, Aug. 28, 1980 Vol. 16 No. 19, that a completely OH-free optical fiber, with no loss peaks due to OH ions at any wavelengths in the loss spectrum from ultraviolet to infrared, has been desired for some time; and that such a fiber will play an important role as a transmission medium for WDM systems. However, this article provides no information regarding the dispersion characteristics of such a fiber, and it provides no information regarding the allocation of optical channels within the usable loss spectrum of optical fiber.

For these and other reasons, an optical transmission system that is compatible with apparatus that was designed for conventional singlemode fiber systems, which permits WDM operation without 4PM interference among WDM signals, and which avoids SRS interference between WDM and analog TV signals, would be of great interest. This application discloses such a system.

TERMINOLOGY

Conventional Fiber—Singlemode glass fiber that is characterized by a dispersion null at about 1310 nm, minimum loss at about 1550 nm, and a region of high loss at about 1385 nm that is attributable to the absorption of optical energy by hydroxyl (OH) ions.

Dispersion—When used alone, this term refers to chromatic dispersion—a linear effect due to wavelength-dependent velocity within the carrier spectrum.

Span—Reference is made here to a length of optical fiber having no regenerators. This length, which likely includes optical amplifiers, is the distance between stations at which the signal has been converted to/from electronic form (commonly the distance between nearest signal regenerators). This span may define an entire system, or may be combined with one or more additional spans.

Average System Wavelength—a specific wavelength determined by the arithmetic average of the carrier frequencies of a group of WDM channels.

Wavelength Region—a shorthand expression for a particular range of wavelengths. The 1.3 micron (μm) wavelength region is defined herein to include all wavelengths between 1285 and 1335 nm; the 1.4 μm wavelength region is defined herein to include all wavelengths between 1335 and 1435 nm; and the 1.55 μm wavelength region is defined herein to include all wavelengths between 1500 and 1600 nm.

WDM—Wavelength-Division Multiplexing. Situation whereby multiple communication channels, each having a different central wavelength, are combined onto a single transmission path such as an optical fiber.

SUMMARY OF THE INVENTION

We have discovered that the above-described deficiencies of prior art systems can be overcome in an optical transmission system that is arranged to transmit multiple WDM channels in the 1.4 μm wavelength region. Such a system includes optical fiber having a suitably low loss at 1385 nm, a zero dispersion wavelength ($\lambda_0$) at about 1310 nm, and linear dispersion between about 1.5 and 8.0 ps/nm-km within the 1.4 $\mu$m wavelength region. This small-but-critical amount of dispersion significantly reduces the effect of four-photon mixing. In its broadest terms, the present invention reflects a number of observations including: (i) four-photon mixing is a relevant mechanism that must be considered in the design of WDM systems; (ii) stimulated Raman scattering from WDM channels has an adverse effect on analog signal transmission at 1550 nm, and (iii) desirably, new WDM systems should be reverse compatible with apparatus used in conventional singlemode fiber systems.

It is an advantage of the present invention that by positioning WDM channels in the 1.4 $\mu$m wavelength region, the wavelength regions around 1310 nm and 1550 nm are available for use by equipment that has traditionally operated in these regions.

It is another advantage of the present invention that by positioning WDM channels in the 1.4 $\mu$m wavelength region, where dispersion is less than about 8 ps/nm-km, dispersion compensation can be avoided in most metropolitan optical transmissions systems where distances are shorter than about 200 kilometers.

It is yet another advantage of the present invention that by positioning WDM channels in the 1.4 $\mu$m wavelength region, a substantial buffer (about 120 nm) exists to protect analog signals, such as broadcast television, operating at 1550 nm from SRS noise.

In illustrative embodiments of the invention, Raman amplifiers are used for amplification of the WDM channels in the 1.4 $\mu$m region, whereas Erbium amplifiers are used for amplification of channels operating in the 1.55 $\mu$m region.

BRIEF DESCRIPTION OF THE DRAWING

The invention and its mode of operation will be more clearly understood from the following detailed description when read with the appended drawing in which.

DETAILED DESCRIPTION

Figure 1:
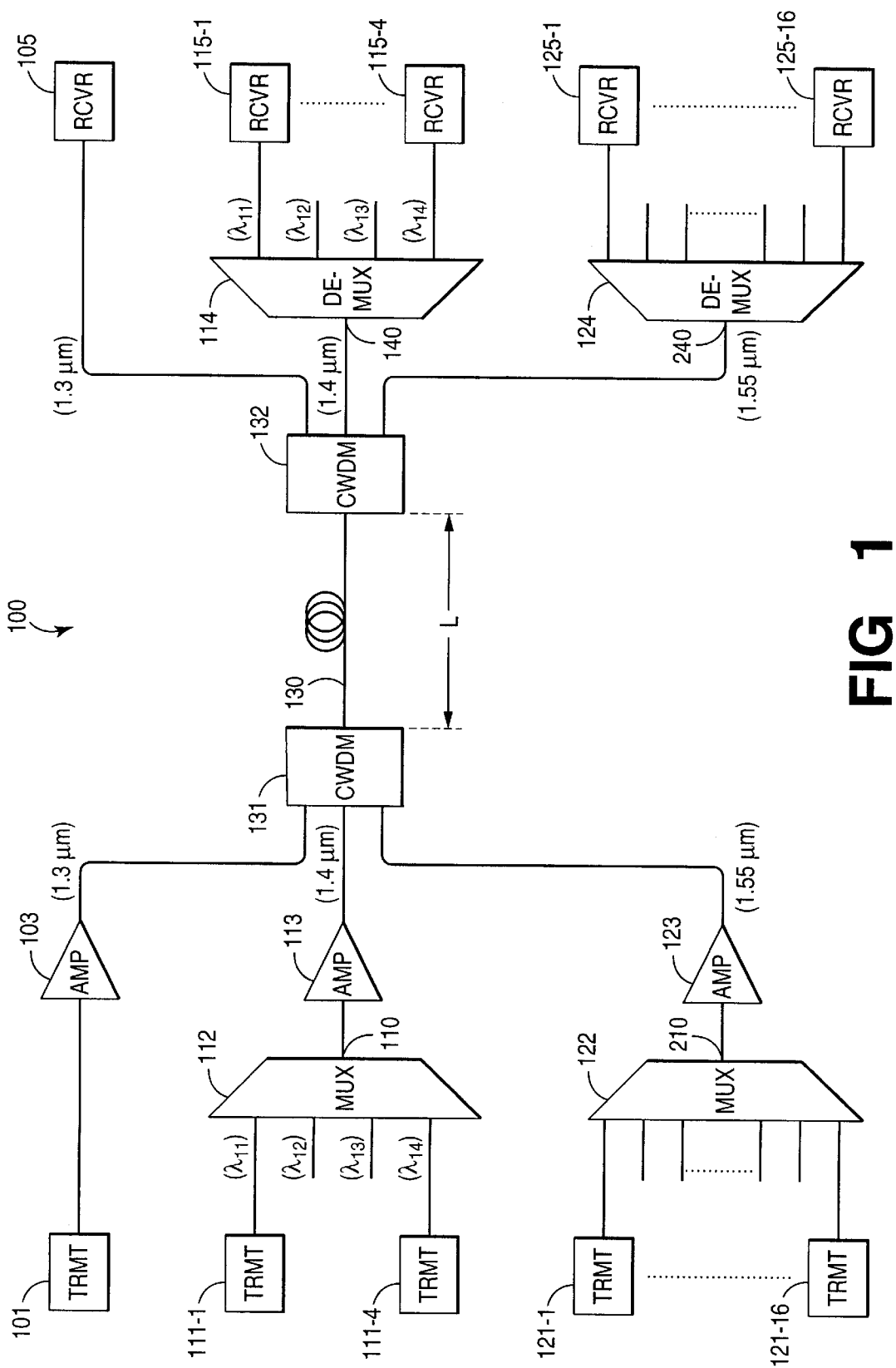
FIG. 1 discloses a first embodiment of a high-capacity optical fiber network including WDM channels in the 1.4 $\mu$m wavelength region operating at a speeds of up to 10 Gb/s each, and WDM channels in the 1.55 $\mu$m wavelength region operating at a speeds of up to 2.5 Gb/s each.

FIG. 1 discloses a high-capacity optical fiber network 100 in accordance with the present invention. Of significance is the fact that a plurality of wavelength-division multiplexed (WDM) channels are operating in the 1.4 $\mu$m wavelength region (i.e., 1335–1435 nm). Additionally, the WDM channels share the same optical fiber with analog CATV signals operating in the 1.3 $\mu$m wavelength region (i.e., 1285–1335 nm) and other WDM channels operating in the 1.55 $\mu$m wavelength region (i.e., 1500–1600 nm). Illustratively, four high speed data channels having carrier wavelengths ($\lambda_{11}$, $\lambda_{12}$, $\lambda_{13}$, $\lambda_{14}$) are shown, each carrier being modulated in transmitters 111 at a data rate of 10 gigabits per second (Gb/s). Such channels are effective for transmitting a substantial amount of digital information including telephony, data and video. These channels are illustratively clustered around 1400 nm and have a center-to-center channel spacing of 100 gigahertz (GHz). And while four channels are shown, a greater or lesser number may be used. Additionally, channel spacing may be greater or lesser than 100 GHz as determined by the network designer based on considerations such as amplifier bandwidth as well as the availability and/or cost of associated apparatus such as multiplexers and demultiplexers. Transmitter 111-1 receives input data at the 10 Gb/s rate and modulates a coherent light source whose nominal wavelength, $\lambda_{11}$, is about 1400 nm. The optical signals are then fed into an optical multiplexer 112 whose task is to combine a plurality of inputs, each one having a different wavelength, onto a single output port 110.

Additionally, sixteen digital channels are shown in the 1.55 $\mu$m wavelength region, each channel comprising a carrier that is modulated in transmitter 121 at a 2.5 Gb/s rate. Such channels are effective for transmitting digital information including telephony, data and video. These channels are clustered around 1550 nm and have a carrier spacing of 100 GHz, which corresponds to 0.8 nm at 1550 nm. And while sixteen channels are shown, a greater or lesser number may be used. Additionally, channel spacing may be greater or lesser than 100 GHz as determined by the network designer based on considerations such as amplifier bandwidth as well as the availability and/or cost of associated apparatus such as multiplexers and demultiplexers. The optical signals from transmitters 121 are fed into optical multiplexer 122 whose task is to combine a plurality of inputs, each one having a different wavelength, onto a single output port 210.

Optical multiplexing and demultiplexing is frequently accomplished via a pair of star couplers that are interconnected by an optical grating (i.e., a number of parallel waveguides—each differing in length with respect to its nearest neighbor by a predetermined fixed amount). Examples of such devices are shown in U.S. Pat. Nos. 5,002,350 and 5,136,671 and 5,412,744. In one direction of optical transmission, the multiplexer can be used as a multiplexer wherein a plurality of separate and distinct wavelengths ($\lambda_{11}$, $\lambda_{12}$, . . . $\lambda_{1n}$) are launched into different input ports of one star coupler and emerge on a single output port of the other star coupler. In the other direction of optical transmission, the multiplexer functions as a demultiplexer wherein a plurality of different wavelengths are launched into a single port of one star coupler and emerge on multiple ports of the other star coupler according to their particular wavelengths.

Depending on the distance between the transmitters (101, 111, 121) and the receivers (105, 115, 125) in network 100, it may be necessary to amplify the optical signals. Optical amplifiers are preferable to regenerators because they amplify optical signals directly without having to convert them into an electrical signals for electronic amplification and then back to optical signals. Preferably, Raman amplifiers 103, 113 are used in the 1.3 and 1.4 $\mu$m wavelength regions while Erbium amplifiers 123 are used in the 1.55 μm region. Nevertheless, Raman amplifiers can be used at all relevant wavelengths within network 100. Raman amplifiers have a useable bandwidth of 25–30 nm (see U.S. Pat. No. 5,623,508, issued Apr. 22, 1997), which is suitable for use in the present invention. Moreover, Raman amplifiers can be arranged in a parallel configuration for increased bandwidth. Indeed, considerable effort has been directed to the design of multi-stage, very broadband optical amplifiers. A paper by M. Yamada et al, in vol. 33, No. 8, *Electronics Letters*, on Apr. 10, 1997 at pages 710–711 is representative. It is understood that semiconductor optical amplifiers may also be used in the present invention at all relevant wavelengths at lower cost, but at lower performance.

Figure 3:
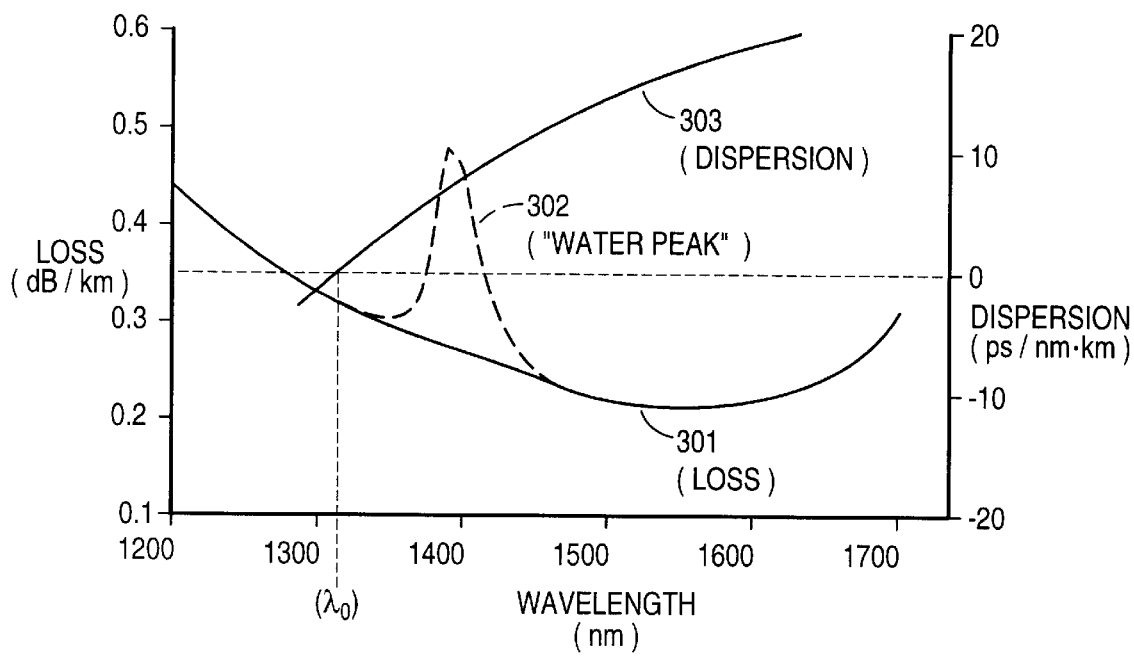
FIG. 3 is a graph showing the chromatic (linear) dispersion and transmission loss characteristics of an optical fiber, which is used in the present invention.

Combining optical signals in three different wavelength regions is accomplished by a coarse WDM (CWDM) 131, which is properly regarded as a "coarse" to differentiate it from routers that accommodate closely spaced channels of a WDM channel set. CWDM 131 combines optical signals in the 1.3 μm, 1.4 μm and 1.55 μm regions onto a single optical fiber 130. Mach-Zehnder interferometers are well known and suitable for use in constructing CWDM 131. Optical fiber 130 comprises a singlemode optical fiber whose loss and dispersion characteristics are shown in FIG. 3. More will be said later regarding the construction and characteristics of optical fiber 130, which extends over a length L without regeneration or dispersion compensation.

Because most optical devices are bilateral, and because the network 100 shown in FIG. 1 is substantially symmetrical, one can readily deduce the operation of the right-half portion. For example, CWDM 132 is a coarse WDM that directs wavelengths in the 1.3 μm region toward receiver 105, wavelengths in the 1.4 μm region toward demultiplexer 114, and wavelengths in the 1.55 μm region toward demultiplexer 124. Similarly, demultiplexer 114 directs optical signals that are present on its input port 140 to a particular output port according to wavelength. This is to say that the 10 Gb/s channel having carrier wavelength $\lambda_{11}$ is routed to one output port while another 10 Gb/s channel having carrier wavelength $\lambda_{12}$ is routed to another output port. In turn, each of the 10 Gb/s channels are delivered to receivers 115 for demodulation and conversion from optical to electrical signaling. The lower portion of FIG. 1 deals with transmission in the 1.55 μm region where 16 channels of information are transmitted from transmitters 121 to receivers 125. In this wavelength region, an Erbium amplifier 123 is preferable. Multiplexer 122 and demultiplexer 124 are functionally similar to the above-described multiplexer 112 and demultiplexer 114. Illustratively, transmitters 121 and receivers 125 are communicating digital information at a 2.5 Gb/s rate. The design of the transmitters (101, 111, 121), receivers (105, 115, 125), multiplexers (112, 122) and demultiplexers (114, 124) is known by those skilled in the relevant art and disclosed in numerous publications.

It is a significant advantage that the span of optical fiber 130 within network 100 may be as long as 200 kilometers without the need for dispersion compensation at bit rates of 10 Gb/s. This is possible because the dispersion of optical fiber 130 is less than about 8.0 ps/nm-km in the 1.4 μm wavelength region, and because the data rate of the WDM channels in the 1.55 μm region are about 2.5 Gb/s or less. Such distances are long enough to cover nearly all metropolitan networks.

Figure 2:
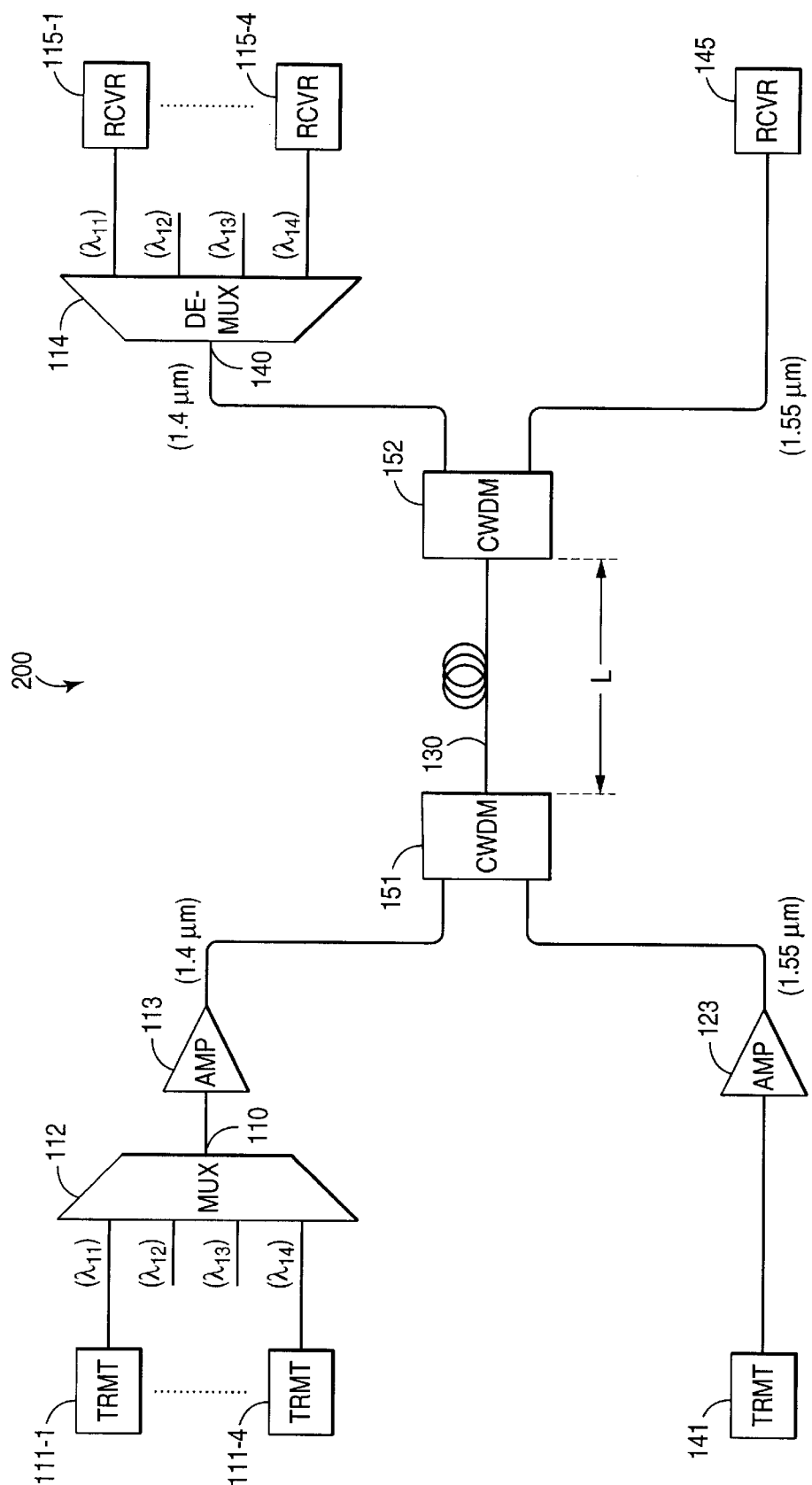
FIG. 2 discloses a second embodiment of a high-capacity optical fiber network including WDM channels in the 1.4 $\mu$m wavelength region operating at speeds of up to 10 Gb/s each, and an analog CATV channel in the 1.55 $\mu$m wavelength region.

FIG. 2 discloses a second embodiment of a high-capacity optical fiber network 200 including WDM channels in the 1.4 μm wavelength region operating at speeds of up to 10 Gb/s each, and an analog CATV channel in the 1.55 μm wavelength region. The components used in network 200 are substantially the same as those used in network 100 (see FIG. 1) with the exception of transmitter 141 and receiver 145, which are adapted to transmit and receive broadcast TV signals in the 1.55 μm region using amplitude modulated vestigial sideband (AM-VSB) modulation. AM-VSB analog modulation is noise-sensitive in that the TV picture suffers degradation when spurious signals are added. FIG. 2 discloses a technique for carrying many optical channels of digital transmission along with broadcast TV, where the TV optical channel is at the preferred wavelength (i.e., 1550 nm) for wide distribution from a Super Head End.

If one transmits multiple wavelengths on a single optical fiber, there are several nonlinear mechanisms that can transfer signal energy from one wavelength to another. One of these mechanisms is stimulated Raman scattering, which is particularly troublesome when there are many wavelengths being carried on one fiber because SRS provides the means for transferring energy to higher wavelengths. The following discussion is taken from pp. 239–248 of the text: *Optical Fiber Telecommunications IIIA*, edited by Kaminow and Koch.

Stimulated Raman scattering (SRS) is a nonlinear parametric interaction between light and molecular vibrations. Light launched in an optical fiber is partially scattered and downshifted in frequency. The change in optical frequency corresponds to the molecular-vibration frequency. SRS is similar to stimulated Brillouin scattering (SBS), but can occur in either the forward or backward direction. The Raman gain coefficient is about three orders of magnitude smaller than the Brillouin gain coefficient, so in a single-channel system the SRS threshold is about three orders of magnitude larger than the SBS threshold. However the gain bandwidth for SRS, on the order of 12 THz or 120 nm, is much larger than that for SBS. This, SRS can couple different channels in a WDM system and give rise to crosstalk.

Figure 7:
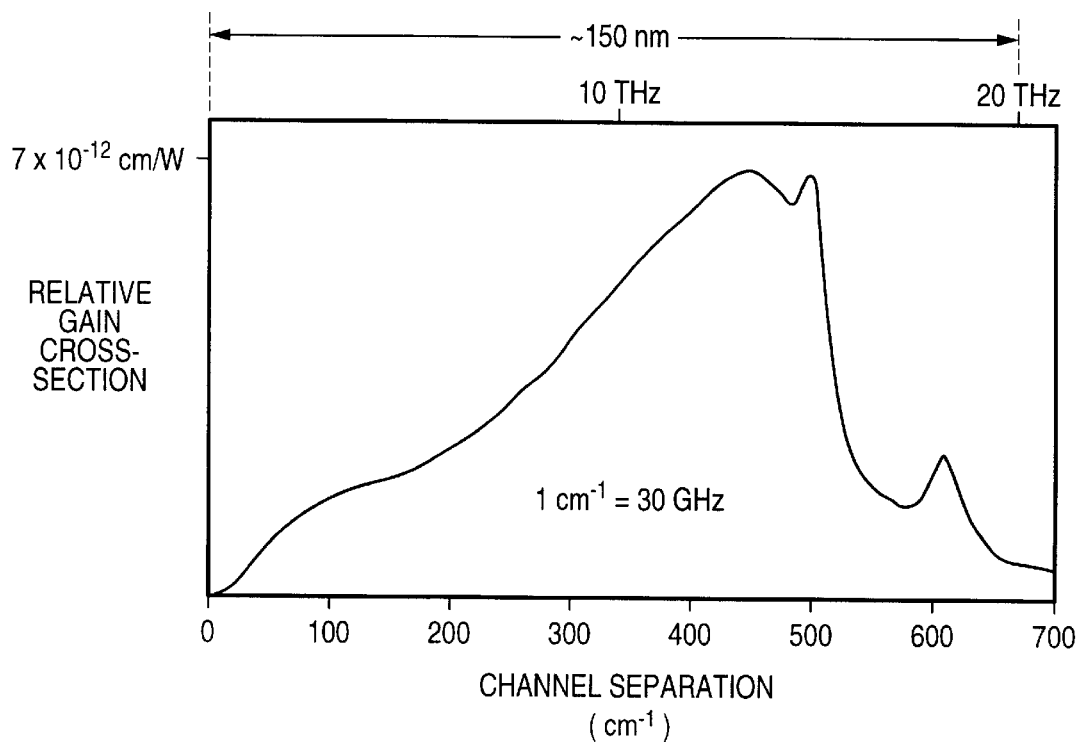
FIG. 7 is a graph showing the Raman gain coefficient versus frequency shift for fused silica at a pump wavelength of 1500 nm.

Reference is briefly made to FIG. 7, which shows the Raman gain in fused silica fiber. Due to SRS, in a WDM system, signals at longer wavelengths are amplified by shorter-wavelength signals, which leads to degradation of the shorter wavelength signals and noise at the longer wavelengths. SRS couples channels separated in wavelength by up to 140 nm, although there is a significant decrease beyond 120 nm. If there are many wavelengths carrying signals, as is the most efficient and preferred way to dense WDM transmission systems, they can all cumulatively contribute energy to any signal that is carried on a wavelength up to 120 nm longer. For an AM-VSB signal propagating in the 1.55 μm region, as indicated in FIG. 2, this means that any signal on a wavelength between 1430 nm and 1550 nm can transfer energy into the AM-VSB signal and degrade it. So, on one hand, broadcast TV signals should be isolated as much as possible, while on the other hand one wishes to exploit the fiber for as many active wavelengths as possible.

FIG. 3 is a graph showing the linear dispersion (303) and transmission loss (301) characteristics of an optical fiber, which is suitable for use in the present invention. Loss in the wavelength region shown is primarily attributable to Rayleigh scattering and hydroxyl ion (OH) absorption. Rayleigh scattering is a basic phenomenon that results from density and compositional variations within the fiber material. Rayleigh scattering is proportional to $1/\lambda^4$, where $\lambda$ is the wavelength of the light. It is fundamental, cannot be eliminated, and sets the lower limit on fiber loss. Loss in the 1.4 μm region, for example, is also determined by the number of OH ions that are present within the glass. Such loss arises from lightwave energy being absorbed by the OH ions at wavelengths that are related to its different vibration modes. Heretofore, operation within the 1.4 μm region has been effectively foreclosed to long-distance optical transmission (i.e., more than 10 kilometers) because of losses attributable to energy absorption by OH ions. Such loss is shown in FIG. 3 as water peak 302, which is associated with conventional glass fiber. Such loss is not present in glass fibers used in the present invention. Indeed, a specification table for an optical fiber, which is suitable for use in the present invention, has been developed. However, it is not intended to define the entire range of acceptable fibers and is presented for illustrative purposes only.

ILLUSTRATIVE FIBER SPECIFICATION TABLE

Maximum Attenuation:

| | |
|---|---|
| 1310 nm | 0.35–0.40 dB/km |
| 1385 nm | 0.31 dB/km |
| 1550 nm | 0.21–0.25 dB/km |
| Mode field diameter: | |
| 1310 nm | 9.3 ± 0.5 μm |
| 1550 nm | 10.5 ± 1.0 μm |
| Core/Clad eccentricity | <0.6 μm |
| Cladding diameter | 125 ± 1.0 μm |
| Cutoff wavelength | <1260 nm |
| Zero-Dispersion Wavelength | 1300–1322 nm |
| Dispersion | >0.8 ps/nm-km (1335–1435 nm) |
| Dispersion slope | <0.092 ps/nm$^2$-km (maximum) |
| Macrobending | <0.5 dB at 1550 nm (1 turn, 32 mm) |
| " | <0.05 dB at 1550 nm (100 turns, 75 mm) |
| Coating diameter | 245 ± 10 μm |
| Proof test | 100 kpsi |

The present invention utilizes optical fiber having low loss in the 1.4 μm wavelength region. By "low loss" is meant that the attenuation experienced by optical signals is substantially reduced over conventional singlemode optical fiber. A commercially viable manufacturing technique for manufacturing such fiber is set forth in application Ser. No. 08/879,348 entitled Optical Fiber Having Low Loss At 1385 nm And Method For Making Same, which was filed on Jun. 20, 1997 and is hereby incorporated by reference. The technique for making such fiber is briefly set forth below.

Figure 4:
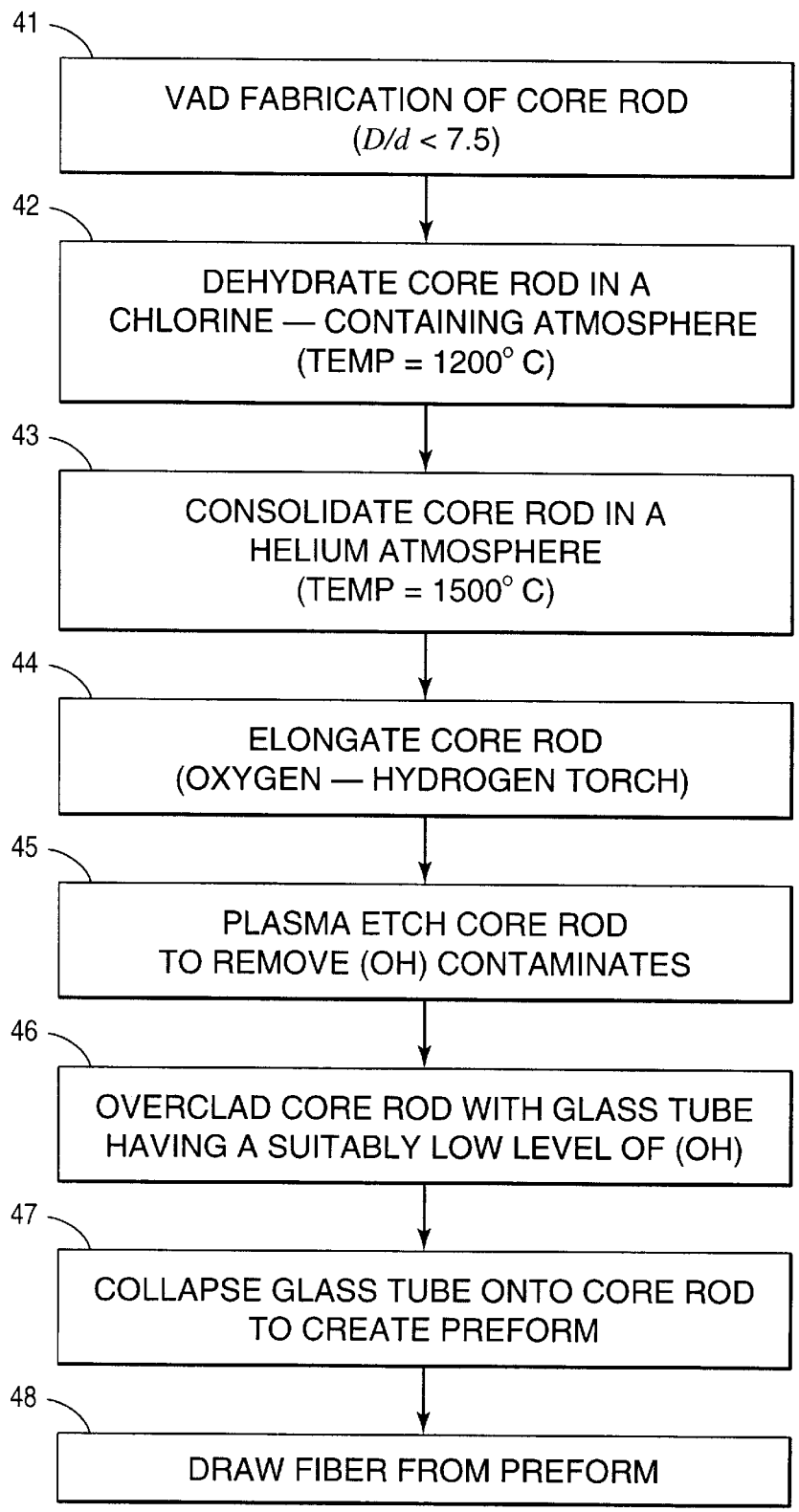
FIG. 4 is a flow chart diagram of a commercially viable technique for making the optical fiber used in the present invention.

FIG. 4 provides a general overview of a technique for fabricating an optical fiber having low loss at 1385 nm. These steps have individual numerals (41–48). The first three steps (numerals 41–43) relate to the fabrication of a core rod having a suitably low OH content (i.e., less than 0.8 parts per billion) that can be overclad with a glass tube. Accordingly, the first three steps can be replaced by the single step of forming a core rod having a deposited cladding/core ratio that is less than 7.5, and having an OH content that is less than 0.8 parts per billion by weight. Preferably, the core rod is fabricated by a Vapor Axial Deposition (VAD) process per step numeral 41 as discussed below:

Core Rod Fabrication

Figure 5:
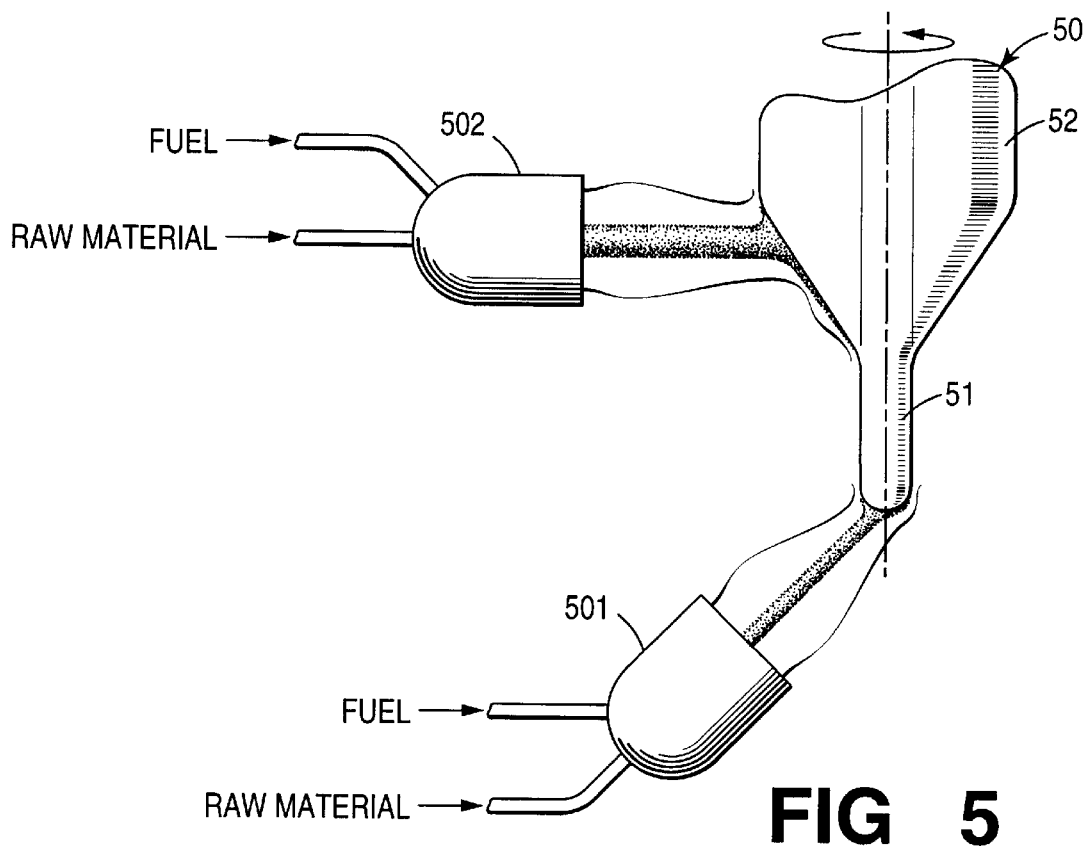
FIG. 5 generally illustrates the fabrication of a core rod by the vapor axial deposition process.

Reference is made to FIG. 5 for a discussion of the VAD process in which glass particles or "soot" are deposited on a silica starting rod. Core rod 50 comprises a core 51 whose index of refraction is higher than the index of refraction of the deposited cladding 52. It is noted that light bends toward the region whose index of refraction is higher, and it this law of physics that is invoked to guide light along the center of an optical fiber. To create a region having a relatively high index of refraction, a torch 501 is supplied with fuel (e.g., oxygen and hydrogen) and raw material (e.g., GeCl$_4$ and SiCl$_4$) such that the torch projects vaporized raw material within a flame toward the center of the glass rod. The flame causes the raw material to react so as to deposit glass particles (soot) onto the core rod 50. The core rod typically extends vertically with the initial deposition at its upper end. It is then moved vertically upward and rotated so that glass soot is deposited along its entire length and circumference. Another torch 502 is used to deposit a layer of glass 52, called the deposited cladding, onto the core 51. The raw material used in torch 502 for making the cladding 52 is SiCl$_4$, for example. It is thus noted that germanium doping of the core 51 is one way to create a core having a higher index of refraction than the cladding. Alternatively, SiCl$_4$ can be the raw material used in making the core 51 while fluorine doping of the deposited cladding will create a cladding with a lower index of refraction than the core. In this situation, fluorides such as SF$_6$, CCl$_2$F$_2$, CF$_4$ are mixed with SiCl$_4$ in the cladding torch 502. Specific details regarding different fiber fabrication processes are contained in Chapter 4 of the textbook *Optical Fiber Telecommunications II*, Academic Press, Inc., © 1988 AT&T and Bell Communications Research, Inc. In particular, section 4.4.4 (pages 169–180) deals with the VAD process and is hereby incorporated by reference.

In the above-described VAD process, the diameter of the deposited cladding (D) is less than 7.5 times the diameter of the core (a). And because core rod fabrication is an expensive process, any time saved in making the core rod translates directly into lower fiber cost. In fact, the amount of VAD deposit required for the core rod is proportional to (D/d)$^2$. But as D/d for the core rod becomes smaller, the need for purity in the overcladding tube becomes greater. By decreasing D/d, more optical power in the fiber travels in the overcladding tube, and impurities such as OH ions cause additional absorption loss. This is because OH ions are mobile and will migrate toward the core, particularly during the fiber draw operation. And, even worse, OH ions can decompose into hydrogen, which is much more mobile than OH itself, and can also diffuse into the fiber core during fiber draw. Subsequent reaction between the hydrogen and atomic defects in the fiber core will cause OH ions to form there. Core rods having deposited cladding/core ratios that are less than 2.0 require overcladding tubes having unusually low OH content, which is not cost effective at the present time. Accordingly, a commercially practical range for deposited cladding/core ratios has been determined to be 2.0<D/d <7.5 at present.

Step numeral 42 in FIG. 4 indicates that the core rod is dehydrated by placing it in a chlorine—or fluorine-containing atmosphere at a temperature of about 1200° C. At this stage, the core rod is a porous soot body and chlorine gas, for example, easily permeates the interstices of the soot body and replaces OH ions with chlorine ions, thereby resulting in a soot body that is substantially water free. The OH ion replacement rate is related to the chlorine gas flow rate and the dehydration temperature.

Step numeral 43 in FIG. 4 indicates that the core rod is consolidated by placing it in a helium atmosphere at a temperature of about 1500° C. Consolidation is the step in which the porous soot rod is converted into a dense glass that is free from particle boundaries. Specific details regarding the dehydration and consolidation steps are provided in U.S. Pat. No. 3,933,454, which issued on Jan. 20, 1976 and is hereby incorporated by reference.

Step numeral 44 in FIG. 4 indicates that the core rod is preferably elongated using an oxygen-hydrogen torch. This is the most cost-effective manner of supplying the large amount of heat needed for this step. Alternatively, this step is carried out using a hydrogen-free plasma torch, as discussed below, and advantageously eliminates the need for etching (step numeral 45). Typically, core rods grown by the VAD process are too large to fit into overcladding tubes of reasonable size, and are usually stretched to decrease their diameter prior to insertion. Stretching is accomplished on a glass lathe whose construction is well known in the art. The core rod is mounted between the headstock and tailstock of the lathe for cojoint rotation therewith. As the core rod rotates, a torch moves below it along its central axis at a constant rate toward the headstock. Simultaneous with the movement of the torch, the tailstock moves away from the headstock, causing the core rod to be stretched to reduce its diameter. Combustible gases, such as hydrogen and oxygen are flowed through the torch at an exemplary rate of 30 liters per minute (1 pm) and 151 pm respectively. And while the use of hydrogen is commercially practical, it creates a layer of OH on the surface of the core rod. Core rod stretching is known in the art and specific details are disclosed, for example, in U.S. Pat. No. 4,578,101 that issued on Mar. 25, 1986.

Core Rod Etching

Step numeral 45 indicates that the elongated core rod is etched, preferably with a hydrogen-free plasma torch. A brief discussion of the plasma etching process is given below, although it is understood that other etching techniques may be employed to effectively remove OH ions from the rod's surface. These other etching techniques include, but are not limited to, mechanical grinding and chemical etching.

An isothermal plasma can be used for rapidly removing (etching) silica and silicate glass from the outer surface of a glass rod (see, e.g., U.S. Pat. No. 5,000,771). With an isothermal plasma torch, the predominant mechanism for material removal is vaporization due to the high plasma temperature, which can typically attain levels greater than 9000° C. in the plasma center. Contact of the electrically conductive fireball with the refractory dielectric surface efficiently transfers energy to the surface, and raises the surface temperature above the vaporization point of the dielectric materials thereon.

Overall fiber cost is reduced through the use of larger overcladding tubes. Preferably, the tube comprises synthetic silica, which is known for its high purity, low attenuation, and high tensile strength. The purity of the overcladding tube will determine just how close to the core it can be placed. Step numeral 46 indicates that the core rod is overclad with a glass tube having a suitably low level of OH, which is to say that as the value of D/d becomes smaller, the purity of the tube needs to be higher (i.e., its OH content needs to be lower). For example, the following table illustrates various OH concentration levels in the overcladding tube that are suitably low for use in the present invention:

| D/d | OH Concentration |
|---|---|
| 7.5 | <200 ppm |
| 5.2 | <1.0 ppm |
| 4.4 | <0.5 ppm |

Figure 6:
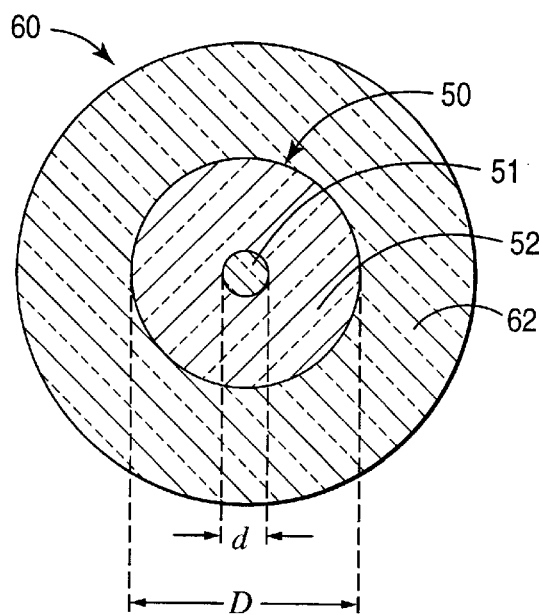
FIG. 6 shows a cross section of an optical fiber preform, which is used for drawing glass fiber used in the present invention.

Step numeral 47 in FIG. 4 indicates that the glass tube is now collapsed onto the core rod to create a preform 60, whose cross section is shown in FIG. 6. Collapse is illustratively achieved by using a ring-type torch to heat the overcladding tube 62, which is vertically oriented and surrounds the rod 50. Details regarding this process are contained in U.S. Pat. No. 4,820,322. Finally, step numeral 48 in FIG. 4 indicates the well-known process of drawing an optical fiber from a heated (about 2000° C.) end portion of the preform.

Although various particular embodiments have been shown and described, it is understood that modifications are possible within the scope of the invention. These modifications include, but are not limited to: a different number of multiplexed channels than is shown in the embodiments of FIG. 1 and FIG. 2; the use of semiconductor optical amplifiers rather than Erbium amplifiers or Raman amplifiers, non-uniform spacing of WDM channels, and operation at data rates other than disclosed.

What is claimed is:

1. A wavelength-division-multiplexing (WDM) system including:

a first multiplexer, operatively interconnecting a plurality of digital information channels onto a transmission path;

a transmission path including an optical fiber span whose length (L) exceeds 10 kilometers and whose zero dispersion wavelength ($\lambda_0$) is about 1310 nm,

CHARACTERIZED IN THAT the optical fiber has a loss at 1385 nm, which is less than its loss at 1310 nm, and a chromatic dispersion of between 1.5 and 8.0 ps/nm-km in the 1.4 $\mu$m wavelength region; and wherein the first multiplexer provides at least three channels of WDM signals in the 1.4 $\mu$m wavelength region onto the transmission path.

2. The WDM system of claim 1 wherein each of the multiplexed channels comprises digital information having at a data rate of at least 5 Gb/s.

3. The WDM system of claim 2 wherein each of the multiplexed channels comprises digital information having at a data rate of at least 10 Gb/s.

4. The WDM system of claim 1 wherein the central wavelengths of adjacent channels are separated from each other by 200 GHz or less.

5. The WDM system of claim 1 further including a channel of modulated optical signals in the 1.3 $\mu$m wavelength region.

6. The WDM system of claim 5 wherein the modulation scheme of said channel in the 1.3 $\mu$m wavelength region comprises amplitude modulated, vestigial sideband (AM-VSB) modulation.

7. The WDM system of claim 1 further including at least one channel of modulated optical signals in the 1.55 $\mu$m wavelength regions.

8. The WDM system of claim 7 wherein the modulation scheme of said channel in the 1.55 $\mu$m wavelength region comprises amplitude modulated, vestigial sideband (AM-VSB) modulation.

9. The WDM system of claim 7 further including a second multiplexer that operatively interconnects a plurality of digital information channels onto the transmission path in the 1.55 $\mu$m wavelength region.

10. The WDM system of claim 9 wherein each of the digital information channels in the 1.55 $\mu$m wavelength region have at a data rate of at least 2.5 Gb/s.

11. The WDM system of claim 1 further including a plurality of transmitters, operatively interconnected to the first multiplexer, each of said transmitters providing modulated optical signals at predetermined wavelengths that are different from each other.

12. The WDM system of claim 1 further including at least one channel of modulated optical signals in the 1.55 μm wavelength region.

13. The WDM system of claim 12 wherein said at least one channel in the 1.55 μm wavelength region comprises analog signals that have been modulated using amplitude modulated, vestigial sideband (AM-VSB) modulation.

14. The WDM system of claim 12 further including a second demultiplexer for interconnecting the optical transmission path to a plurality of receiver, wherein said at least one channel in the 1.55 μm wavelength region comprise a plurality of digital information channels.

15. The WDM system of claim 14 wherein each of the digital information channels in the 1.55 μm wavelength region are operating at a data rate of 2.5 Gb/s or less.

16. A wavelength-division-multiplexing (WDM) system including:
a first demultiplexer for interconnecting an optical transmission path having a plurality of digital information channels to a plurality of receivers;
a transmission path, including an optical fiber span whose length (L) exceeds 10 kilometers and whose zero dispersion wavelength ($\lambda_0$) is about 1310 nm,
CHARACTERIZED IN THAT
the optical fiber has a loss at 1385 nm, which is less than its loss at 1310 nm, and a chromatic dispersion of between 1.5 and 8.0 ps/nm-km in the 1.4 μm wavelength region, and
wherein the first demultiplexer receives at least three channels of multiplexed optical signals in the 1.4 μm wavelength region from the transmission path.

17. The WDM system of claim 16 wherein each of the multiplexed channels comprises digital information having at a data rate of at least 5 Gb/s per second.

18. The WDM system of claim 17 wherein each of the multiplexed channels comprises digital information having at a data rate of 10 Gb/s.

19. The WDM system of claim 16 further including a channel of modulated optical signals in the 1.3 μm wavelength region.

20. The WDM system of claim 19 wherein the modulation scheme of said channel in the 1.3 μm wavelength region comprises amplitude modulated, vestigial sideband (AM-VSB) modulation.

21. Wavelength-division multiplexed optical waveguide system including:
a first transmitter for generating, modulating, and multiplexing modulated channel carriers for introduction onto a transmission line, the first transmitter being characterized by an "average system wavelength" within the 1.4 μm wavelength region;
a first receiver for performing functions including demultiplexing modulated channel carriers;
a transmission line of optical fiber including at least one fiber span defined at one end by a transmitter and at the other end by a receiver, in which the optical fiber has a zero dispersion wavelength ($\lambda_0$) at about 1310 nm
CHARACTERIZED IN THAT
substantially all fiber defining the span has a chromatic dispersion of between 1.5 and 8.0 ps/nm-km at the average system wavelength; and
substantially all fiber defining the span has a transmission loss at 1385 nm that is less than its transmission loss at 1310 nm.

22. System of claim 21 wherein the first transmitter provides at least three high-capacity digital information channels, each of the digital information channels operating at $\geq 5.0$ Gb/s.

23. System of claim 21 wherein each of the digital information channels operating at about 10 Gb/s or higher.

24. System of claim 21 further including one or more optical amplifiers, which provide amplification in the 1.4 μm wavelength region, said amplifiers comprising Raman amplifiers.

25. System of claim 21 further including a channel operating at about 1550 nm, said channel comprising analog video information.

26. System of claim 21 further including a channel operating at about 1310 nm, said channel comprising analog video information.

27. System of claim 21 further including:
a second transmitter for generating, modulating, and multiplexing modulated channel carriers for introduction onto a transmission line, the second transmitter providing a plurality of multiplexed data channels in the 1.55 μm wavelength region; and
a second receiver for performing functions including demultiplexing modulated channel carriers in the 1.55 μm wavelength region.

28. Wavelength-division multiplexed optical waveguide system including:
apparatus for transmitting and receiving a plurality of digital information channels, each channel operating at a different wavelength within the 1.4 μm region at a 10 Gb/s rate;
apparatus for transmitting and receiving a plurality of digital information channels, each channel operating at a different wavelength within the 1.55 μm region at a 2.5 Gb/s rate;
a transmission line comprising a length (L) of optical fiber extending between the transmitting and receiving apparatuses without dispersion compensation, wherein the length (L) is between 10 kilometers and 200 kilometers; and
wherein the optical fiber is characterized by (i) a zero-dispersion wavelength at about 1310 nm, (ii) a dispersion that is less than about 8.0 ps/nm-km for all channels in the 1.4 μm region, and (iii) a transmission loss at 1385 nm that is less than its transmission loss at 1310 nm.

* * * * *

UNITED STATES PATENT AND TRADEMARK OFFICE
CERTIFICATE OF CORRECTION

PATENT NO. : 6,205,268 B1
DATED : March 20, 2001
INVENTOR(S) : Chraplyvy et al.

It is certified that error appears in the above-identified patent and that said Letters Patent is hereby corrected as shown below:

<u>Title page, Item [54] and column 1,</u>
Lines 1-3, "ARRANGEMENT OF OPTICAL FIBER SEGMENTS FOR MINIMIZING EFFECT OF NON-LINEARITIES" should be corrected to read -- HIGH-CAPACITY OPTICAL FIBER NETWORK OPERATING IN THE 1.4µM REGION --

Signed and Sealed this

Fourth Day of December, 2001

Attest:

*Nicholas P. Godici*

NICHOLAS P. GODICI
*Attesting Officer*      *Acting Director of the United States Patent and Trademark Office*